United States Patent
Vössing et al.

(10) Patent No.: US 6,487,528 B1
(45) Date of Patent: Nov. 26, 2002

(54) METHOD AND APPARATUS FOR ENCODING OR DECODING AUDIO OR VIDEO FRAME DATA

(75) Inventors: Walter Vössing, Hannover (DE); Ulrich Schreiber, Garbsen (DE)

(73) Assignee: Deutsche Thomson-Brandt GmbH, Villingen-Schwenningen (DE)

(*) Notice: Subject to any disclaimer, the term of this patent is extended or adjusted under 35 U.S.C. 154(b) by 0 days.

(21) Appl. No.: 09/478,635

(22) Filed: Jan. 6, 2000

(30) Foreign Application Priority Data

Jan. 12, 1999 (EP) ............................................. 99250006

(51) Int. Cl.⁷ ............................................. G10L 21/00
(52) U.S. Cl. ........................ 704/229; 704/230; 704/500
(58) Field of Search ................................. 704/500, 501, 704/502, 503, 504, 230, 201, 200, 229, 224; 381/307, 22, 23, 80

(56) References Cited

U.S. PATENT DOCUMENTS

| | | | |
|---|---|---|---|
| 4,845,752 A | | 7/1989 | Blanc et al. .................. 381/31 |
| 5,315,584 A | * | 5/1994 | Savary et al. .................. 370/18 |
| 5,592,450 A | * | 1/1997 | Yonemitsu et al. ......... 386/111 |
| 5,596,565 A | * | 1/1997 | Yonemitsu et al. ......... 348/342 |
| 5,706,396 A | | 1/1998 | Schroder et al. ........... 395/2.37 |
| 6,269,394 B1 | * | 7/2001 | Kenner et al. .............. 709/217 |

FOREIGN PATENT DOCUMENTS

| | | | | |
|---|---|---|---|---|
| EP | 1 020 997 A2 | * | 7/2000 | ............ H04B/1/66 |
| EP | 1 020 998 A2 | * | 7/2000 | ............ H04B/1/66 |

* cited by examiner

Primary Examiner—Richemond Dorvil
(74) Attorney, Agent, or Firm—Joseph S. Tripoli; Ronald H. Kurdyla; Joel M. Fogelson

(57) ABSTRACT

For broadcasting purposes a multi-channel audio encoder board has been designed. A requirement for such encoders is that they are able to operate with different encoding parameters. It may happen that encoding parameters change during encoding operation. In order to avoid the output of invalid data the encoding parameters required for a specific processing path are added to the input streams for the audio channels and become linked with the associated audio data and are stored in various buffers together with its audio data, i.e. the corresponding encoding parameters are kept linked with the audio data to be encoded throughout the encoding processing.

12 Claims, 2 Drawing Sheets

METHOD AND APPARATUS FOR ENCODING OR DECODING AUDIO OR VIDEO FRAME DATA

FIELD OF THE INVENTION

The invention relates to a method and to an apparatus for encoding or decoding audio or video frame data.

BACKGROUND OF THE INVENTION

For broadcasting purposes a 4-stereo-channel MPEG audio encoder board has been designed. A requirement for such encoders is that they are able to operate with different encoding parameters. MPEG allows e.g. various sample frequencies and overall data rates.

SUMMARY OF THE INVENTION

A problem arises when during normal encoding operation one or more parameters change. This may happen when the current type of program changes, e.g. from pure speech or news to music.

Normally the audio frames are processed in an encoder in subsequent different stages, for example conversion to frequency coefficients in a first stage and bit allocation and quantisation in a further stage. In a path in parallel to the first stage the psychoacoustic masking is calculated. A video encoder includes the following stages: block difference stage, DCT (discrete cosine transform), quantisation and in the feedback loop inverse quantisation, inverse DCT, motion compensated interpolation the output of which is input to the block difference stage, wherein the output of the quantisation is possibly VLC (variable length coding) encoded and buffered before final output and the buffer filling level is used to control the quantisation in such a way that encoding artefacts are masked as far as possible. If the encoding parameters would generally change at a time instant where a certain audio frame has been processed in such first stage but not yet in such further stage, the data of this frame will become useless after having been processed in the further stage with the changed encoding parameters.

In order to avoid such problem a big table with the old encoding parameters and a big table with the new encoding parameters could be stored in the encoder for some time for each channel wherein the 'depth' of the tables would depend on the number of streams within the encoder and which would require repeated updating. All processing stages of the encoder would need to have access to both channel tables and would need to determine at which time to access which of the tables. In particular in a multichannel encoder in which different channels may change different encoding parameters at different times, the channels possibly being assigned to different microprocessors, this solution could easily produce errors. The tables would require more memory capacity than the solution described below.

It is one object of the invention to disclose a method for encoding or decoding audio or video frame data for which encoding or decoding parameters are required. It is a further object of the invention to disclose an apparatus which utilises the inventive method.

In the invention intermediately stored general parameter tables are not used. Instead, the encoding parameters required for a specific processing path are added to the input streams for the audio channels and become linked with the associated audio data and are stored in the various buffers together with its audio data, i.e. the corresponding encoding parameters are kept linked with the audio data to be encoded throughout the encoding processing in the different data streams and data paths. Preferably the original encoding parameters assigned to the processing paths become converted to a different format in order to minimise the required word length and/or to facilitate easy evaluation in the related processing stages.

Thereby each data stream can be processed with the correct parameter set without waiting for finishing encoding of the old data stream and for reset and loading of new parameters before starting encoding of a new data stream with new parameters.

The invention can also be used in audio or video decoders whith a corresponding inverse order of processing stages.

In principle, the inventive method is suited for encoding audio or video frame data for which encoding parameters are required, wherein the required encoding parameters become linked at the input of the processing with frames of said audio or video data to be encoded and throughout different stages in the encoding processing, and wherein in each of theses stages the corresponding encoding parameters linked with current frame data to be processed are regarded in order to allow switching of the encoding parameters for any frame thereby avoiding encoding of invalid output data without reset, or:

for decoding audio or video frame data for which decoding parameters are required, wherein the required decoding parameters become linked at the input of the processing with frames of said audio or video data to be decoded and throughout different stages in the decoding processing, and wherein in each of theses stages the corresponding decoding parameters linked with current frame data to be processed are regarded in order to allow switching of the decoding parameters for any frame thereby avoiding decoding of invalid output data without reset.

In principle the inventive apparatus is suited for encoding audio or video frame data for which encoding parameters are required, and includes:

means for linking the required encoding parameters with frames of said audio or video data, said linking means arranged near the input of the apparatus;

means for converting time domain samples into frequency domain coefficients, to the input of which means buffer means are assigned;

means for calculating masking properties from said time domain samples, to the input of which means buffer means are assigned;

means for performing bit allocation and quantisation of the coefficients under the control of the output of said masking calculating means, to the input of which bit allocation and quantisation means buffer means are assigned, wherein in said conversion means, in said masking calculating means and in said bit allocation and quantisation means the corresponding encoding parameters linked with current frame data to be processed are regarded in order to allow switching of the encoding parameters for any frame thereby avoiding encoding of invalid output data without reset.

BRIEF DESCRIPTION OF THE DRAWINGS

Embodiments of the invention are described with reference to the accompanying drawings, which show in.

DETAILED DESCRIPTION OF PREFERRED EMBODIMENTS

Figure 1:
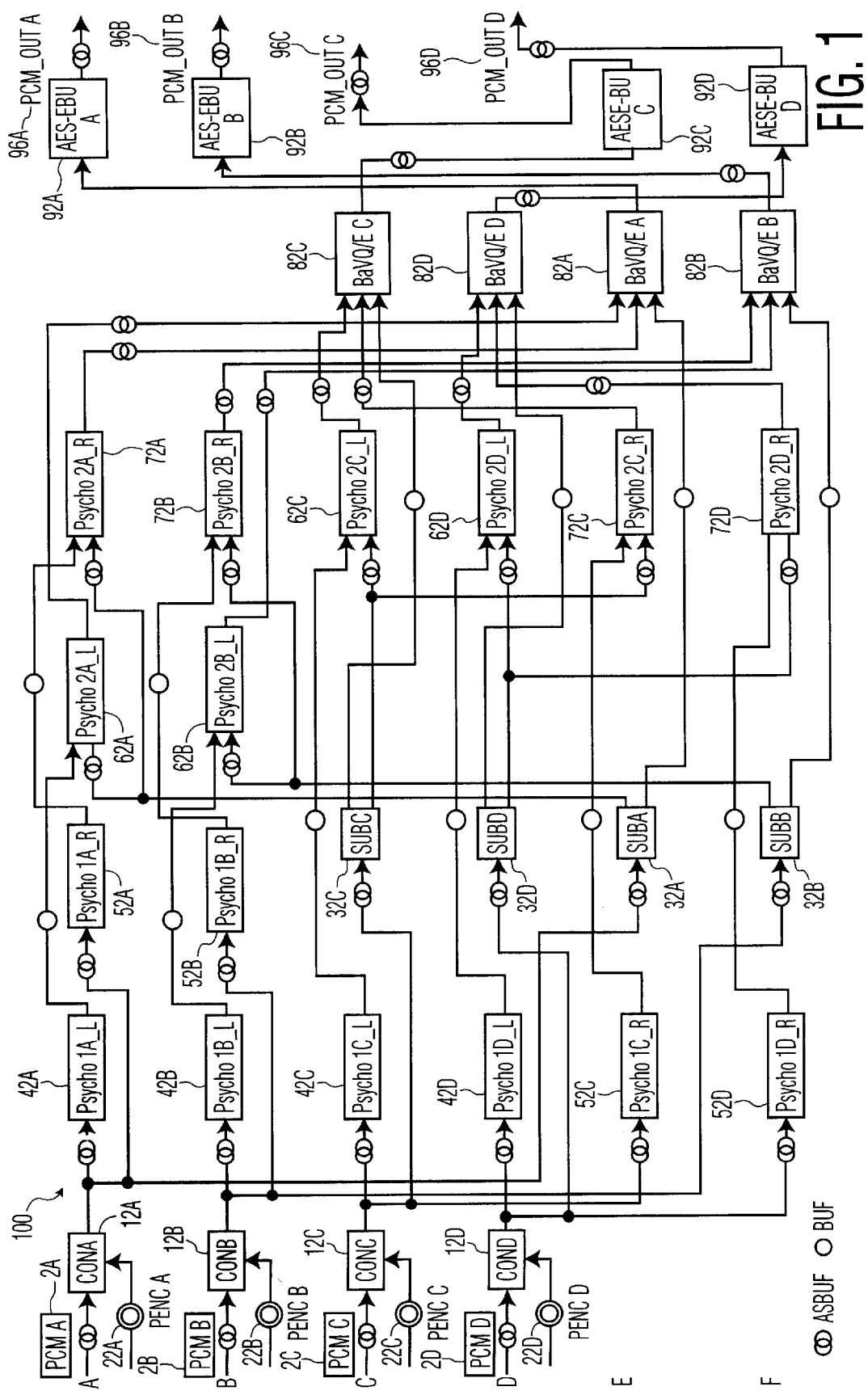
FIG. 1 functional block diagram of a 4-channel audio encoder.

The audio encoder (100) in FIG. 1 receives four stereo PCM input signals PCMA (2A), PCMB (2B), PCMC (2C) and PCMD (2D). E.g. MPEG audio data are frame based, each frame containing 1152 mono or stereo samples. The encoder operating system of FIG. 1 may include six DSPs (Digital Signal Processor, not depicted) for the encoding of the four MPEG channels. These DSPs form a software encoder which includes the technical functions depicted in FIG. 1. A suitable type of DSP is for example ADSP 21060 or 21061 or 21062 of Analog Devices. As an alternative, the technical functions depicted in FIG. 1 can be realised in hardware.

Synchronisation of the software running on the six DSPs, or on corresponding hardware, is achieved using FIFO buffers wherein each buffer is assigned to one or some specific frames. This means that at a certain time instant a current frame as well as previous frames, the number of which depends from the quantity of available buffers, are present in the processing stages.

A global parameter switching would cause assignment of the new parameters to also such buffers which still contain data to be processed by the previous set of parameters. This would make the content of such buffers useless. In the invention, however, various encoding parameters like coding mode (mono, stereo, dual, joint stereo), sample rate and data rate can be changed 'on the fly' without reset and without producing invalid encoder output data.

Between some of the stages asynchronous buffers ASBUF are inserted which allow asynchronous write and read operations. Between other stages synchronous buffers BUF are sufficient. The PCM input signals PCMA (2A), PCMB (2B), PCMC (2C) and PCMD (2D) each pass via an asynchronous buffer to a respective converter CONA (12A), CONB (12B), CONC (12C) and COND (12D). In such converter an integer-to-floating representation conversion of the audio samples to be encoded may take place. It is also possible that the encoder processes integer representation audio samples.

In such converter also one or more kinds of energy levels in a frame may be calculated, e.g. energy of all samples of the frame or average energy of the samples of a frame. These energy values may be used in the subsequent psychoacoustic processing.

In addition, in such converter the possibly adapted encoding parameters become linked with the frame audio data. In respective parameter encoders PENCA (22A), PENCB (22B), PENCC (22C) and PENCD (22D) the original encoding parameters may be converted as described above and then fed to CONA (12A), CONB (12B), CONC (12C) and COND (12D), respectively. In an MPEG decoder the decoding parameters in the transmitted datastream may be adapted correspondingly according to the hardware or software requirements in the decoder before being (re-)linked to each data frame.

Via asynchronous buffers the output data of CONA (12A), CONB (12B), CONC (12C) and COND (12D) are fed in parallel to sub-band filters SUBA (32A), SUBB (32B), SUBC (32C) and SUBD (32D) and to first left and right channel psychoacoustic calculators Psycho1A_L (42A), Psycho1A_R (52A), Psycho1B_L (42B), Psycho1B_R (52B), Psycho1C_L (42C), Psycho1C_R (52C), Psycho1D_L (42D) and Psycho1D_R (52D), respectively. The subband filters divide the total audio spectrum into frequency bands, possibly using FFT, and may calculate the maximum or scale factor of the coefficients in a frequency band or subband. Within the frequency bands a normalisation may be carried out. The subband filters take into account the relevant encoding parameters read from the corresponding upstream asynchronous buffer.

The first psychoacoustic calculators perform an FFT having a length of e.g. 1024 samples and determine the current masking information. Each first psychoacoustic calculator can be followed by a second psychoacoustic calculator Psycho2A_L (62A), Psycho2A_R (72A), Psycho2B_L (62B), Psycho2B_R (72B), Psycho2C_L (62C), Psycho2C_R (72C), Psycho2D_L (62D) and Psycho2D_R (72D), respectively, which evaluates the maximum or scale factor values previously calculated in the subband filters. The first and second psychoacoustic calculators take into account the relevant encoding parameters read from the corresponding upstream asynchronous buffers.

The output signals of Psycho2A_L (62A), Psycho2A_R (72A), Psycho2B_L (62B), Psycho2B_R (72B), Psycho2C_L (62C), Psycho2C_R (72C), Psycho2D_L (62D) and Psycho2D_R (72D) are used in bit allocators and quantisers Bal/Q/E_A (82A), Bal/Q/E_B (82B), Bal/Q/E_C (82C) and Bal/Q/E_D (82D), respectively, for determining the number of bits allocated and the quantisation the audio data coefficients coming from the associated subband filter via a buffer. It is also possible to calculate in the second psychoacoustic calculators in addition what is being calculated in the first psychoacoustic calculators and thereby to omit the first psychoacoustic calculators.

Finally, the outputs of Bal/Q/E_A (82A), Bal/Q/E_B (82B), Bal/Q/E_C (82C) and Bal/Q/E_D (82D) pass through an asynchronous buffers and output interfaces AES-EBU_A (92A), AES-EBU_B (92B), AES-EBU_C (92C), AES-EBU_D (92D), respectively, which deliver the encoder stereo output signals PCM_Out_A (96A), PCM_Out_B (96B), PCM_Out_C (96C), PCM_Out_D (96D), respectively.

Figure 2:
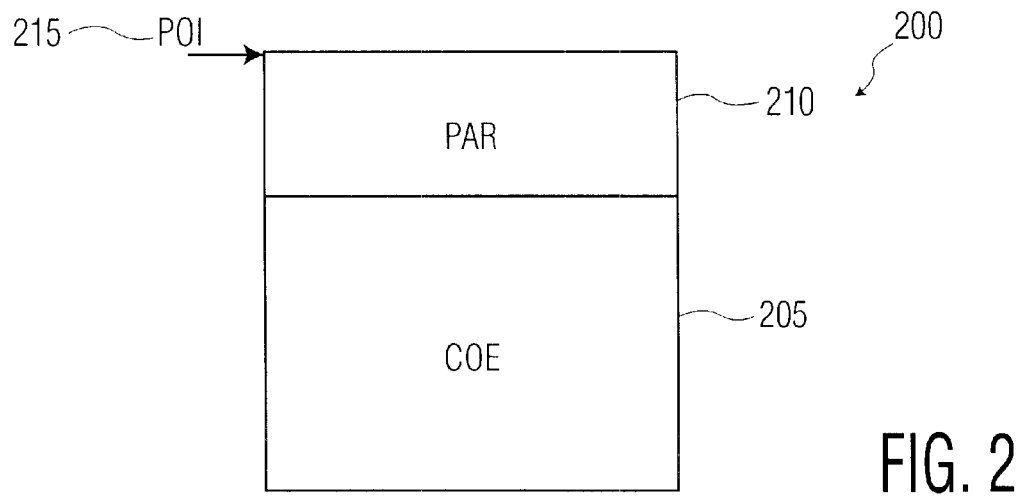
FIG. 2 linked data field including audio data to be encoded and associated encoding parameters.

FIG. 2 shows a data field (200) including audio samples or audio coefficients COE (205) for a frame. To these samples or coefficients encoding or decoding parameters PAR (210) are linked or assigned. PAR (210) includes for instance mode information (mono, stereo, dual, joint stereo), sample rate and data rate information, length of the data field, type of MPEG layer. An address pointer POI (215) indicates the beginning of the parameter data PAR (210).

Figure 3:
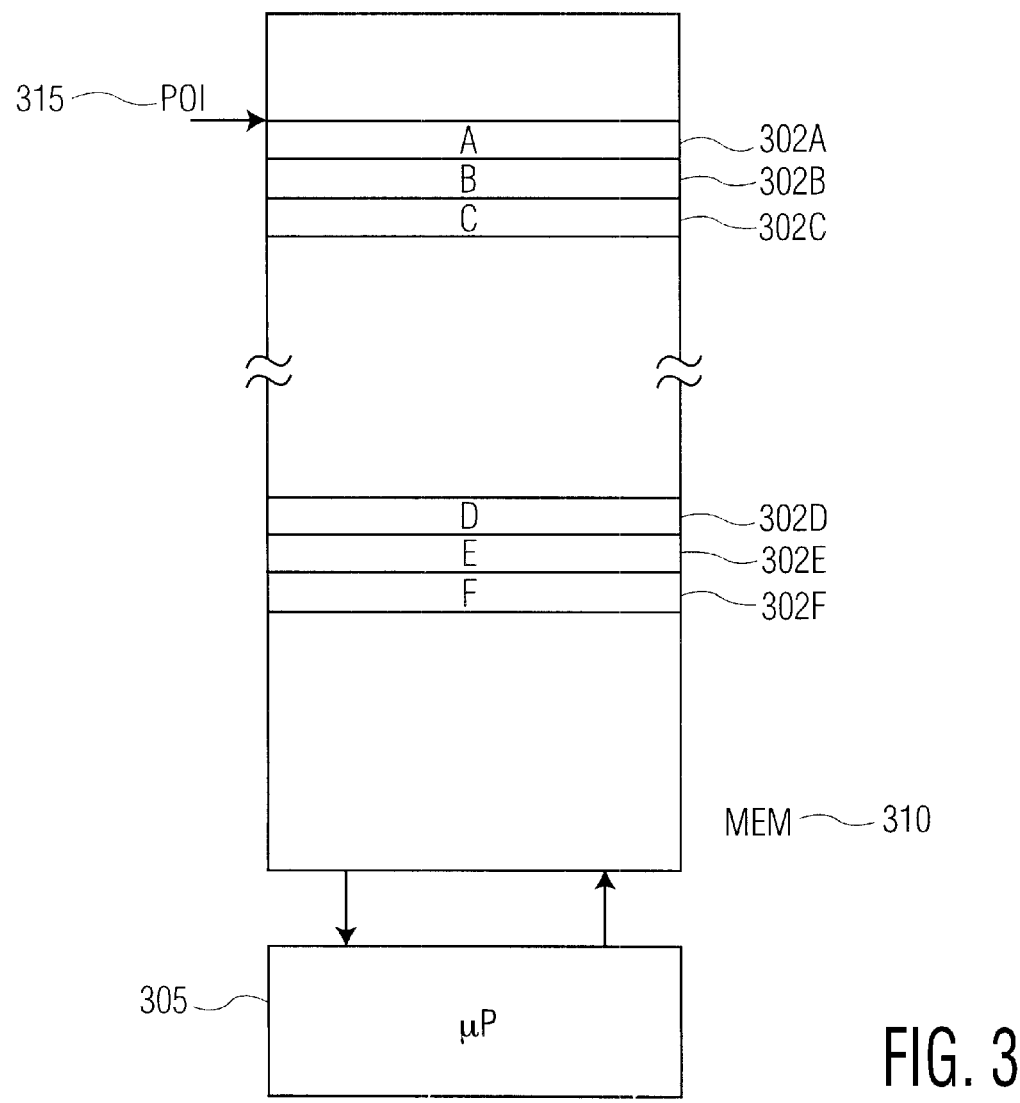
FIG. 3 microprocessor with memory including linked data fields.

In FIG. 3 a microprocessor or DSP $\mu$P (305) is shown together with its memory MEM (310). In the memory some data fields A to F (302A to 302F, respectively) are depicted which correspond to data fields as shown in FIG. 2. E.g. data fields A (302A), B (302B) and C (302C) may correspond to data fields of three succeeding audio frames in one of the data paths of FIG. 1. Data field A (302A) may include other encoding parameters PAR than data fields B (302B) and C (302C). The address of the beginning of data field B can be calculated by adding the length of data field A (302A) to POI (315).

The software running on $\mu$P (305) can use the following example commands in C-language for constructing the data fields according to FIG. 2:

```
typedef struct {
    .
    .
    .
    int bitrate_index
    int sampling_frequency
    .
    .
    .
} layer;
"struct" may also contain time stamp information.
#define FRAMESIZE 1152    /*1152 is a decimal number*/
typedef struct }
    .
    .
    .
    layer info
    .
    .
    .
    float PCMBuf[FRAMESIZE]
} FloatBuffer_L_Type
```

The invention can be used e.g. for MPEG 1, 2 and 4 Audio encoding and decoding for MPEG layers 1, 2 or 3, Digital Video Broadcast DVB, for AC-3, MD and AAC processing, for DVD processing and Internet applications concerning audio or video data encoding and decoding.

What is claimed is:

1. Method for encoding at least one of audio and video frame data for which encoding parameters are required, including the following steps:

linking the required encoding parameters at the input of the processing with frames of said at least one of audio and video data to be encoded;

keeping the required encoding parameters linked throughout different subsequent stages in the encoding processing, wherein in each of theses stages the corresponding encoding parameters linked with current frame data to be processed are regarded in order to allow switching of the encoding parameters for any frame thereby avoiding encoding of invalid output data without reset.

2. Method according to claim 1, wherein the required encoding parameters become converted to a different format before being linked to the frames of said at least one of audio and video data to be encoded or decoded.

3. Method according to claim 1, wherein to each stage an asynchronous buffer is assigned to an input of the stage and wherein the asynchronous buffer contains data fields including said at least one of audio and video frame data and the required encoding parameters.

4. Method according to claim 2, wherein to each stage an asynchronous buffer is assigned to an input of the stage and wherein the asynchronous buffer contains data fields including said at least one of audio and video frame data and the required encoding parameters.

5. Method for decoding at least one of audio and video frame data for which decoding parameters are required, including the following steps:

linking the required decoding parameters at the input of the processing with frames of said at least one of audio and video data to be decoded;

keeping the required decoding parameters linked throughout different subsequent stages in the decoding processing, wherein in each of theses stages the corresponding decoding parameters linked with current frame data to be processed are regarded in order to allow switching of the decoding parameters for any frame thereby avoiding decoding of invalid output data without reset.

6. Method according to claim 5, wherein the required decoding parameters become converted to a different format before being linked to the frames of said at least one of audio and video data to be encoded or decoded.

7. Method according to claim 5, wherein to each stage an asynchronous buffer is assigned to an input of the stage and wherein the asynchronous buffer contains data fields including said at least one of audio and video frame data and the required decoding parameters.

8. Method according to claim 6, wherein to each stage an asynchronous buffer is assigned to an input of the stage and wherein the asynchronous buffer contains data fields including said at least one of audio and video frame data and the required decoding parameters.

9. Apparatus for encoding at least one of audio and video frame data for which encoding parameters are required, and including:

means for linking the required encoding parameters with frames of said at least one of audio and video data, said linking means being arranged near the input of the apparatus;

means for converting time domain samples into frequency domain coefficients, to the input of which means buffer means are assigned;

means for calculating masking properties from said time domain samples, to the input of which means buffer means are assigned;

means for performing bit allocation and quantisation of the coefficients under the control of the output of said masking calculating means, to the input of which bit allocation and quantisation means buffer means are assigned, wherein in said conversion means, in said masking calculating means and in said bit allocation and quantisation means the corresponding encoding parameters linked with current frame data to be processed are regarded in order to allow switching of the encoding parameters for any frame thereby avoiding encoding of invalid output data without reset.

10. Apparatus according to claim 9, wherein the required encoding parameters become converted to a different format before being linked to the frames of said audio or video data to be encoded or decoded.

11. Apparatus according to claim 9, wherein said buffer means contain data fields including said at least one of audio and video frame data and the required encoding parameters.

12. Apparatus according to claim 10, wherein said buffer means contain data fields including at least one of audio and video frame data and the required encoding parameters.

* * * * *